(12) United States Patent
Lin et al.

(10) Patent No.: US 10,827,117 B2
(45) Date of Patent: Nov. 3, 2020

(54) METHOD AND APPARATUS FOR GENERATING INDOOR PANORAMIC VIDEO

(71) Applicant: Hangzhou Hikvision Digital Technology Co., Ltd., Hangzhou (CN)

(72) Inventors: Yaodong Lin, Hangzhou (CN); Quanzhan Wang, Hangzhou (CN); Jie Chen, Hangzhou (CN); Bin Guo, Hangzhou (CN)

(73) Assignee: Hangzhou Hikvision Digital Technology Co., Ltd., Hangzhou (CN)

( * ) Notice: Subject to any disclaimer, the term of this patent is extended or adjusted under 35 U.S.C. 154(b) by 0 days.

(21) Appl. No.: 16/096,931

(22) PCT Filed: Dec. 13, 2016

(86) PCT No.: PCT/CN2016/109600
§ 371 (c)(1),
(2) Date: Oct. 26, 2018

(87) PCT Pub. No.: WO2017/185765
PCT Pub. Date: Nov. 2, 2017

(65) Prior Publication Data
US 2019/0124260 A1 Apr. 25, 2019

(30) Foreign Application Priority Data
Apr. 28, 2016 (CN) .......................... 2016 1 0280032

(51) Int. Cl.
*H04N 5/232* (2006.01)
*G06T 3/00* (2006.01)
*H04N 13/111* (2018.01)

(52) U.S. Cl.
CPC ....... *H04N 5/23238* (2013.01); *G06T 3/0018* (2013.01); *G06T 3/0087* (2013.01); *H04N 5/232* (2013.01); *H04N 13/111* (2018.05)

(58) Field of Classification Search
CPC .. H04N 5/23238; H04N 5/232; G06T 3/0018; G06T 3/0087
See application file for complete search history.

(56) References Cited

U.S. PATENT DOCUMENTS

| 7,176,960 B1 * | 2/2007 | Nayar | .................. G06T 3/4038 |
| | | | 348/207.99 |
| 8,675,013 B1 * | 3/2014 | Romaszewicz | ......... G06T 15/20 |
| | | | 345/622 |

(Continued)

FOREIGN PATENT DOCUMENTS

| CN | 101938599 A | 1/2011 |
| CN | 102222337 A | 10/2011 |
| CN | 103065318 A | 4/2013 |
| CN | 103617606 A | 3/2014 |
| CN | 104363421 A | 2/2015 |

OTHER PUBLICATIONS

Supplementary Partial European Search Report of European Application No. 16 90 0270.

*Primary Examiner* — Jonathan R Messmore
(74) *Attorney, Agent, or Firm* — Blank Rome LLP

(57) ABSTRACT

Embodiments of the present application disclose a method and apparatus for generating an indoor panoramic video. For each of frames of the fish-eye video, coordinates of each of pixels of this frame in an image coordinate system are converted into coordinates in a spherical coordinate system to obtain a spherical coordinate system-based hemispherical fish-eye image. The frustum parameters of each of the N texture images of N viewing angles for the hemispherical fish-eye image are determined according to a shape of a preset living room. Based on the frustum parameters of each of the N texture images of N viewing angles, the N texture (Continued)

images of N viewing angles for the hemispherical fish-eye image are obtained. The N texture images of N viewing angles are rendered onto the N faces inside the preset living room, to generate the panoramic video image corresponding to the frame. As such, in the embodiment of the present application, a panoramic video image having a stereoscopic effect can be generated. The real-time performance for generating a panoramic video is improved, as no complicated image stitching algorithm is used. In addition, the cost for camera devices can be reduced, as there is no need for several cameras or an aerial camera.

15 Claims, 5 Drawing Sheets

(56) References Cited

U.S. PATENT DOCUMENTS

| | | | |
|---|---|---|---|
| 2004/0196282 A1* | 10/2004 | Oh | G06T 17/00 345/419 |
| 2009/0041379 A1 | 2/2009 | Shih | |
| 2010/0033551 A1* | 2/2010 | Agarwala | G06T 3/0018 348/36 |
| 2012/0200665 A1* | 8/2012 | Furumura | G06T 3/0062 348/36 |
| 2014/0104156 A1* | 4/2014 | Touma | G06F 3/014 345/156 |
| 2016/0269629 A1* | 9/2016 | Martin | H04N 5/23238 |

* cited by examiner camera device

METHOD AND APPARATUS FOR GENERATING INDOOR PANORAMIC VIDEO

The present application is a U.S. National Stage Application of International Application No. PCT/CN2016/109600, filed Dec. 13, 2016, which claims the priority to a Chinese Patent Application No. 201610280032.0, filed with the State Intellectual Property Office of the People's Republic of China on Apr. 28, 2016 and entitled "Method and Apparatus for Generating an Indoor Panoramic Video", which is incorporated into the present application by reference in its entirety.

TECHNICAL FIELD

The present application relates to the technical field of video surveillance, and in particular to a method and apparatus for generating an indoor panoramic video.

BACKGROUND

With the continuous development of technology, panoramic videos have shown great value and advantages in many fields. For example, in a video surveillance system, a panoramic video of an indoor scene (such as a supermarket) being monitored may be generated from video images captured by a camera, so as to allow surveillance with better effect.

Currently, a panoramic video may be generated in several manners.

In one of the manners, the same scene is shot in different viewing angles, and the obtained video images are stitched into a sphere through an image stitching algorithm. This will require the use of several cameras or an aerial camera, and thus lead to a high cost. In addition, the image stitching algorithm is complicated, and thus the real-time performance of the obtained panoramic video is poor.

In another, the scene is shot by a fish-eye camera having a very large viewing angle. The obtained images are then unwrapped through PTZ (Pan/Tilt/Zoom, which can perform the movement in all dimensions (left, right, up, and down), variable magnification and zoom control correction) to obtain an unwrapped panoramic image. In this case, the image unwrapped through PTZ is still two-dimensional and has little difference from a conventional video in regard of viewing effect. Accordingly, the user experience is poor.

SUMMARY

Embodiments of the present invention provide a method and apparatus for generating an indoor panoramic video, so as to improve the real-time performance of the generating of panoramic videos and provide a stereoscopic presentation.

Embodiment of the present application disclose a method for generating an indoor panoramic video, which is applicable to a video processing device. The method includes:

acquiring a fish-eye video;

for each frame of the fish-eye video, converting, according to a first preset rule, coordinates of each of pixels of the frame in an image coordinate system into coordinates in a spherical coordinate system to obtain a spherical coordinate system-based hemispherical fish-eye image;

determining, according to a shape of a preset living room, frustum parameters of each of N texture images of N viewing angles for the hemispherical fish-eye image, wherein the shape of the preset living room is set based on a scene corresponding to the frame; and obtaining, based on the frustum parameters of each of the N texture images of N viewing angles, the N texture images of N viewing angles for the hemispherical fish-eye image, and rendering the N texture images of N viewing angles onto N faces inside the preset living room, to generate a panoramic video image corresponding to the frame.

Optionally, converting, according to a first preset rule, coordinates of each of pixels of the frame in an image coordinate system into coordinates in a spherical coordinate system to obtain a spherical coordinate system-based hemispherical fish-eye image may include:

converting, according to following formulas, the coordinates (u, v) of each of the pixels of the frame in the image coordinate system into the coordinates (x, y, z) in the spherical coordinate system to obtain the spherical coordinate system-based hemispherical fish-eye image:

$$u-0.5=x=R*\cos(\alpha)*\cos(\theta)$$

$$v-0.5=y=R*\cos(\alpha)*\sin(\theta)$$

$$z=R*\sin(\alpha)$$

wherein, R is a radius of a hemisphere for the hemispherical fish-eye image, $\alpha$ is an angle between a point in the hemispherical fish-eye image and the Y-axis, and $\theta$ is an angle between a point in the hemispherical fish-eye image and the X-axis.

Optionally, when the preset living room is a cuboid living room, determining, according to a shape of a preset living room, frustum parameters of each of N texture images of N viewing angles for the hemispherical fish-eye image may includes:

constructing an inscribed cuboid of a sphere corresponding to the hemispherical fish-eye image, wherein a length-to-width-to-height radio of the inscribed cuboid is the same as a length-to-width-to-height radio of the cuboid living room; and determining, according to the inscribed cuboid, the frustum parameters of each of the N texture images of N viewing angles for the hemispherical fish-eye image.

Optionally, the frustum parameters may include angle parameters and viewport parameters of a frustum;

determining, according to the inscribed cuboid, the frustum parameters of each of the N texture images of N viewing angles for the hemispherical fish-eye image may include:

determining the angle parameters of the frustum of each of the N texture images of N viewing angles according to angles between faces of the inscribed cuboid, wherein the angle parameters include azimuth parameters and elevation parameters; and determining the viewport parameters of the frustum of each of the N texture images of N viewing angles according to lengths of edges of the inscribed cuboid, wherein the viewport parameters include left, right, down, up, front and back boundary parameters.

Optionally, when the preset living room is a cuboid living room, obtaining the N texture images of N viewing angles for the hemispherical fish-eye image may include:

obtaining four texture images in directions respectively pointing to four walls and one texture image in a direction pointing to a floor for the hemispherical fish-eye image.

Optionally, rendering the N texture images of N viewing angles onto N faces inside the preset living room, may include:

drawing faces in which the four walls and the floor inside the preset living room are located, and determining coordinates for each of the faces;

adjusting, according to the frustum parameters of the four texture images in the directions respectively pointing to the four walls and the one texture image in the direction pointing to the floor for the hemispherical fish-eye image, the coordinates for the four texture images in the directions respectively pointing to the four walls and the one texture image in the direction pointing to the floor for the hemispherical fish-eye image to positions corresponding to the coordinates for the faces in which the four walls and the floor are located.

Optionally, acquiring a fish-eye video includes:

receiving a fish-eye video sent by one fish-eye camera placed at the center of the ceiling of the living room.

For the purpose mentioned above, embodiments of the present application further disclose an apparatus for generating an indoor panoramic video, which is applicable to a video processing device. The apparatus includes:

an acquisition module configured for acquiring a fish-eye video;

a conversion module configured for, for each frame of the fish-eye video, converting, according to a first preset rule, coordinates of each of pixels of the frame in an image coordinate system into coordinates in a spherical coordinate system to obtain a spherical coordinate system-based hemispherical fish-eye image;

a determination module configured for determining, according to a shape of a preset living room, frustum parameters of each of N texture images of N viewing angles for the hemispherical fish-eye image, wherein the shape of the preset living room is set based on a scene corresponding to the frame;

an obtaining module configured for obtaining, based on the frustum parameters of each of the N texture images of N viewing angles, the N texture images of N viewing angles for the hemispherical fish-eye image; and a generation module configured for rendering the N texture images of N viewing angles onto N faces inside the preset living room, to generate a panoramic video image corresponding to the frame.

Optionally, the conversion module is further configured for:

converting, according to following formulas, the coordinates $(u, v)$ of each of the pixels of the frame in the image coordinate system into the coordinates $(x, y, z)$ in the spherical coordinate system to obtain the spherical coordinate system-based hemispherical fish-eye image:

$$u-0.5=x=R*\cos(\alpha)*\cos(\theta)$$

$$v-0.5=y=R*\cos(\alpha)*\sin(\theta)$$

$$z=R*\sin(\alpha)$$

wherein, R is a radius of a hemisphere for the hemispherical fish-eye image, $\alpha$ is an angle between a point in the hemispherical fish-eye image and the Y-axis, and $\theta$ is an angle between a point in the hemispherical fish-eye image and the X-axis.

Optionally, the determination module may include:

a construction sub-module configured for, when the preset living room is a cuboid living room, constructing an inscribed cuboid of a sphere corresponding to the hemispherical fish-eye image, wherein a length-to-width-to-height radio of the inscribed cuboid is the same as a length-to-width-to-height radio of the cuboid living room; and a determination sub-module configured for determining, according to the inscribed cuboid, the frustum parameters of each of the N texture images of N viewing angles for the hemispherical fish-eye image.

Optionally, the frustum parameters include angle parameters and viewport parameters of a frustum; the determination sub-module may include:

an angle parameter determination sub-module configured for determining the angle parameters of the frustum of each of the N texture images of N viewing angles according to angles between faces of the inscribed cuboid, wherein the angle parameters include azimuth parameters and elevation parameters; and a viewport parameter determination sub-module configured for determining the viewport parameters of the frustum of each of the N texture images of N viewing angles according to lengths of edges of the inscribed cuboid, wherein the viewport parameters include left, right, down, up, front and back boundary parameters.

Optionally, the obtaining module may be further configured for:

when the preset living room is a cuboid living room, obtaining, based on the frustum parameters of each of the N texture images of N viewing angles, four texture images in directions respectively pointing to four walls and one texture image in a direction pointing to a floor for the hemispherical fish-eye image.

Optionally, the generation module may include:

a living room drawing sub-module, configured for drawing faces in which the four walls and the floor inside the preset living room are located, and determining coordinates for each of the faces; and a panoramic video image generation sub-module, configured for adjusting, according to the frustum parameters of the four texture images in the directions respectively pointing to the four walls and the one texture image in the direction pointing to the floor for the hemispherical fish-eye image, the coordinates for the four texture images in the directions respectively pointing to the four walls and the one texture image in the direction pointing to the floor for the hemispherical fish-eye image to positions corresponding to the coordinates for the faces in which the four walls and the floor are located, so as to generate the panoramic video image corresponding to the frame.

Optionally, the acquisition module may be further configured for:

receiving a fish-eye video sent by one fish-eye camera placed at the center of the ceiling of the living room.

For the purpose mentioned above, embodiments of the present application further disclose a camera device, including a fish-eye camera and a processor; wherein, the fish-eye camera is configured for shooting a fish-eye video of a preset living room, and sending the fish-eye video to the processor; the processor is configured for performing the above method for generating an indoor panoramic video.

For the purpose mentioned above, embodiments of the present application further disclose an executable program code which, when executed, performs the above method for generating an indoor panoramic video.

For the purpose mentioned above, embodiments of the present application further disclose a storage medium for storing an executable program code, wherein the executable program code, when executed, performs the above method for generating an indoor panoramic video.

As can be seen from the above technical solutions, in the embodiments of the present application, for each of the frames of the fish-eye video, the coordinates of each of the pixels of the frame in an image coordinate system are converted into coordinates in a spherical coordinate system to obtain a spherical coordinate system-based hemispherical fish-eye image. The frustum parameters of each of the N texture images of N viewing angles for the hemispherical fish-eye image are determined according to the shape of a preset living room. Based on the frustum parameters of each of the N texture images of N viewing angles, the N texture images of N viewing angles for the hemispherical fish-eye image are obtained. The N texture images of N viewing angles are rendered onto the N faces inside the preset living room, to generate the panoramic video image corresponding to the frame. As such, in the embodiment of the present application, each frame of the fish-eye video can be rendered onto N faces inside the preset living room, and thus a panoramic video image having a stereoscopic effect is generated. The real-time performance for generating a panoramic video is improved, as no complicated image stitching algorithm is used in embodiments of the present application. In addition, the cost for camera devices can be reduced, as there is no need to stitch multiple videos shot by several cameras and there is no need for an aerial camera in embodiments of the present application.

Of course, any one of the products or methods implementing the present application is not necessarily required to achieve all of the advantages described above at the same time.

BRIEF DESCRIPTION OF THE DRAWINGS

To describe the solutions of embodiments of the present application and the prior art more clearly, the accompanying drawings to be used in the embodiments and the prior art are described briefly below. Obviously, the accompanying drawings described below are merely some embodiments of the application, based on which those skilled in the art can obtain other drawings without creative efforts.

DETAILED DESCRIPTION

To make the objectives, technical solutions, and advantages of the present application more comprehensible, the present application is described in detail below in association with embodiments with reference to the accompanying drawings. Obviously, the described embodiments are merely a part of but not all the embodiments of the present application. All other embodiments obtained without creative efforts in view of the embodiments of the present application by those skilled in the art fall within the scope of the present application.

In order to solve the problem in the prior art, embodiments of the present application provide a method and apparatus for generating an indoor panoramic video, applicable to a video processing device. The method for generating an indoor panoramic video provided by an embodiment of the present application is described firstly in detail below.

Figure 1:
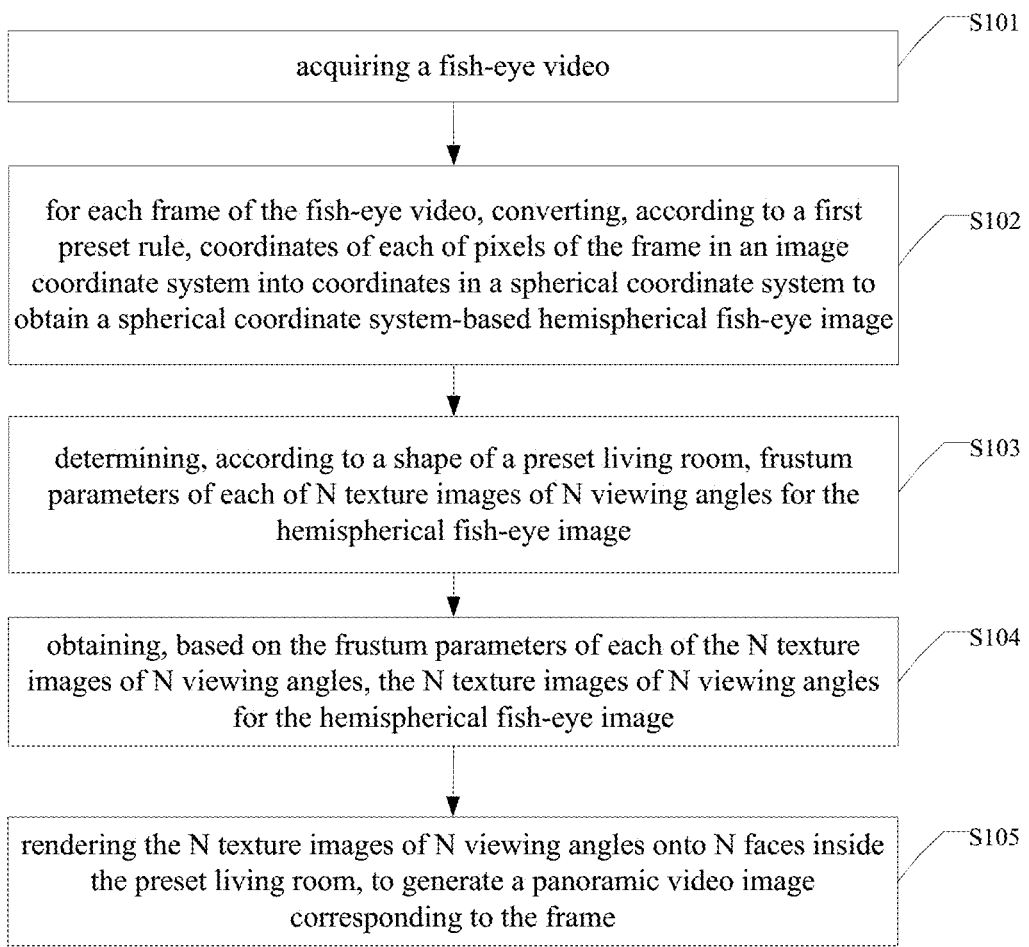
FIG. 1 is a flow chart of a method for generating an indoor panoramic video provided by an embodiment of the present application.

FIG. 1 is a flow chart of a method for generating an indoor panoramic video provided by an embodiment of the present application. The method includes the following operations.

S101: acquiring a fish-eye video.

Specifically, the S101 may include: receiving a fish-eye video sent by one fish-eye camera placed at the center of the ceiling of a living room.

S102: for each frame of the fish-eye video, converting, according to a first preset rule, coordinates of each of pixels of the frame in an image coordinate system into coordinates in a spherical coordinate system to obtain a spherical coordinate system-based hemispherical fish-eye image.

Specifically, the S102 may include: converting, according to following formulas, the coordinates (u, v) of each of the pixels of the frame in the image coordinate system into the coordinates (x, y, z) in the spherical coordinate system to obtain the spherical coordinate system-based hemispherical fish-eye image:

$$u-0.5=x=R*\cos(\alpha)*\cos(\theta)$$

$$v-0.5=y=R*\cos(\alpha)*\sin(\theta)$$

$$z=R*\sin(\alpha)$$

wherein, R is the radius of the hemisphere for the hemispherical fish-eye image, $\alpha$ is an angle between a point in the hemispherical fish-eye image and the Y-axis, and $\theta$ is an angle between a point in the hemispherical fish-eye image and the X-axis.

S103: determining, according to a shape of a preset living room, frustum parameters of each of N texture images of N viewing angles for the hemispherical fish-eye image. The shape of the preset living room is set based on a scene corresponding to the frame. In the embodiment of the present application, N is a positive integer.

Specifically, when the preset living room is a cuboid living room, the S103 may include:

constructing an inscribed cuboid of a sphere corresponding to the hemispherical fish-eye image; wherein, a length-to-width-to-height radio of the inscribed cuboid is the same as a length-to-width-to-height radio of the cuboid living room; and determining, according to the inscribed cuboid, the frustum parameters of each of the N texture images of N viewing angles for the hemispherical fish-eye image.

In the embodiment shown in the present application, the frustum parameters may include angle parameters and viewport parameters of the frustum; determining, according to the inscribed cuboid, the frustum parameters of each of the N texture images of N viewing angles for the hemispherical fish-eye image may include:

determining the angle parameters of the frustum of each of the N texture images of N viewing angles according to angles between faces of the inscribed cuboid, wherein the angle parameters include azimuth parameters and elevation parameters; and determining the viewport parameters of the frustum of each of the N texture images of N viewing angles according to lengths of edges of the inscribed cuboid, wherein the viewport parameters include left, right, down, up, front and back boundary parameters.

S104: obtaining, based on the frustum parameters of each of the N texture images of N viewing angles, the N texture images of N viewing angles for the hemispherical fish-eye image.

In the embodiment as shown in the present application, when the preset living room is a cuboid living room, obtaining the N texture images of N viewing angles for the hemispherical fish-eye image may include: obtaining four texture images in directions respectively pointing to four walls and one texture image in a direction pointing to a floor for the hemispherical fish-eye image.

S105: rendering the N texture images of N viewing angles onto N faces inside the preset living room, to generate a panoramic video image corresponding to the frame.

In the embodiment shown in the present application, the S105 may include:

drawing faces in which the four walls and the floor inside the preset living room are located, and determining coordinates for each face;

adjusting, according to the frustum parameters of the four texture images in the directions respectively pointing to the four walls and the one texture image in the direction pointing to the floor for the hemispherical fish-eye image, the coordinates for the four texture images in the directions respectively pointing to the four walls and the one texture image in the direction pointing to the floor for the hemispherical fish-eye image to positions corresponding to the coordinates for the faces in which the four walls and the floor are located.

Figure 2:
FIG. 2 illustrates a frame of a fish-eye video obtained through the method for generating an indoor panoramic video as shown in FIG. 1.

Assuming that the living room is a supermarket with a cuboid shape, and a fish-eye video sent by a fish-eye camera placed at the center of the ceiling of the living room is received. It is also assumed that one frame of this fish-eye video is shown in FIG. 2.

For this frame of the fish-eye video, the coordinates (u, v) of each of pixels of the frame in the image coordinate system are converted, according to the following formulas, into the coordinates (x, y, z) in the spherical coordinate system to obtain a spherical coordinate system-based hemispherical fish-eye image:

$$u-0.5=x=R*\cos(\alpha)*\cos(\theta)$$

$$v-0.5=y=R*\cos(\alpha)*\sin(\theta)$$

$$z=R*\sin(\alpha)$$

wherein, R is the radius of the hemisphere for the hemispherical fish-eye image, $\alpha$ is the angle between a point in the hemispherical fish-eye image and the Y-axis, and $\theta$ is the angle between a point in the fish-eye hemisphere image and the X-axis.

Figure 3:
FIG. 3 illustrates a spherical coordinate system-based fish-eye hemisphere image obtained through the method for generating an indoor panoramic video as shown in FIG. 1.

The obtained spherical coordinate system-based hemispherical fish-eye image is shown in FIG. 3.

It is assumed that the cuboid supermarket has a length-to-width-to-height ratio of 5:4:3, the inscribed cuboid of the sphere corresponding to the hemispherical fish-eye image is constructed to have the same length-to-width-to-height ratio of 5:4:3. It can be understood that, when the radius of the sphere is fixed and the length-to-width-to-height ratio of the inscribed cuboid is fixed, the length, width and height of this inscribed cuboid can be determined based on the radius of the sphere and the length-to-width-to-height ratio of this inscribed cuboid. It is assumed that the length, width and height of this inscribed cuboid are respectively represented by Length, Width and Height.

The frustum parameters of each of the N texture images of N viewing angles for the hemispherical fish-eye image may be determined according to the inscribed cuboid. The frustum parameters may include angle parameters and viewport parameters of the frustum. The angle parameters may include azimuth parameters and elevation parameters; the viewport parameters may include left, right, down, up, front and back boundary parameters.

Figure 4:
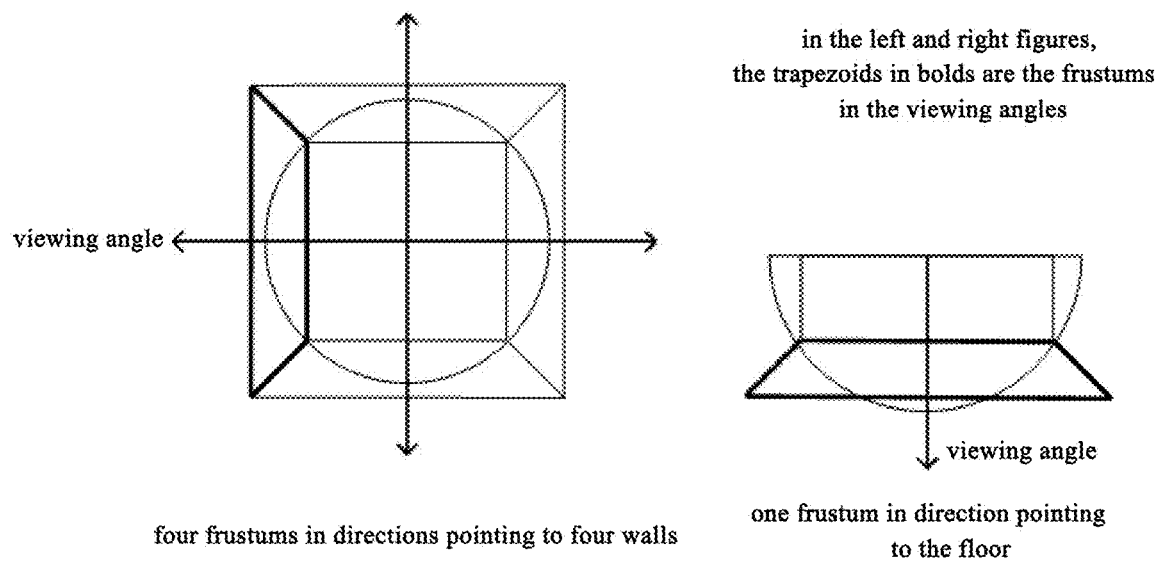
FIG. 4 is a schematic diagram of a method for determining the frustum of a texture image in a viewing direction provided in an embodiment of the present application.

In the embodiment as shown in the present application, the N texture images of N viewing angles for the hemispherical fish-eye image may be one texture image in a direction pointing to a floor (Floor) and four texture images in directions respectively pointing to four walls (Left wall, Back wall, Right wall and Front wall) for the hemispherical fish-eye image. As shown in FIG. 4, an inscribed cuboid of the sphere corresponding to the hemispherical fish-eye image is constructed. The frustum of each of five texture images of five viewing angles for the hemispherical fish-eye image may be determined based on the inscribed cuboid, and then the frustum parameters are obtained. Specifically, the frustum parameters of each of the five texture images of five viewing angles for the hemispherical fish-eye image can be determined according to table 1.

Table 1

| | angle parameters | | viewport parameters | | | | | |
| | azimuth | elevation | left boundary | right boundary | down boundary | up boundary | forward boundary | back boundary |
| --- | --- | --- | --- | --- | --- | --- | --- | --- |
| Floor | 0° | 90° | −Width/2 | Width/2 | −Length/2 | Length/2 | Height/2 | R |
| Left wall | 0° | 0° | −Length/2 | Length/2 | −Height/2 | 0 | Width/2 | R |
| Back wall | 90° | 0° | −Width/2 | Width/2 | −Height/2 | 0 | Length/2 | R |
| Right wall | 180° | 0° | −Length/2 | Length/2 | −Height/2 | 0 | Width/2 | R |
| Front wall | 270° | 0° | −Width/2 | Width/2 | −Height/2 | 0 | Length/2 | R |

Figure 5:
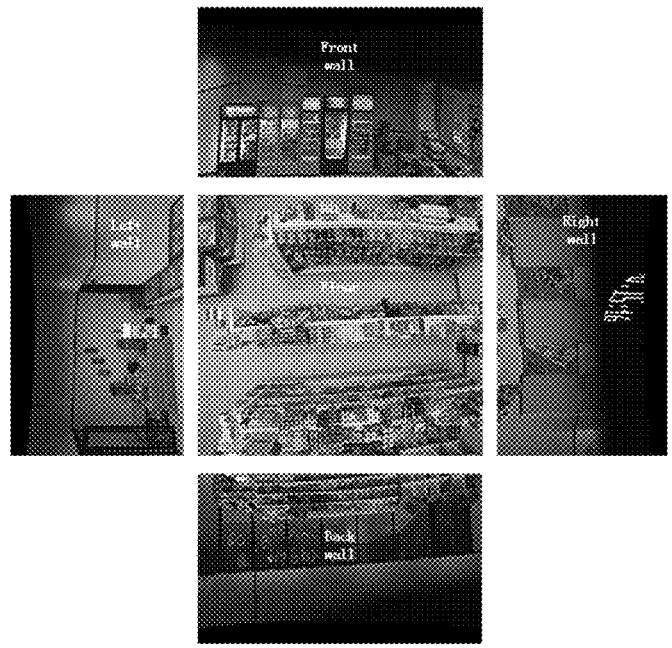
FIG. 5 illustrates texture images for 5 viewing directions of the fish-eye hemisphere image as shown in FIG. 3.

Based on the frustum parameters of each of the five texture images described above, the five texture images of five viewing angles for the hemispherical fish-eye image are obtained. It can be understood by those skilled in the art that the obtaining of the texture images for the hemispherical fish-eye image based on the frustum parameters may be achieved by the existing technology. The detailed description thereof is thus omitted here. The obtained four texture images in the directions respectively pointing to the four walls and the obtained one texture image in the direction pointing to the floor for the hemispherical fish-eye image are shown in FIG. 5.

In a practical application, this video processing device may present an input interface, such that the user may input the actual values of the length, width and height of the cuboid supermarket. The video processing device scales down the actual values of the length, width and height in equal proportion to be matched with the five texture images of five viewing angles. Specifically, it is assumed that the hemispherical fish-eye image has an radius R of 0.1 m, and the actual values of the length, width and height of the cuboid supermarket are 5 m, 4 m and 3 m respectively. The actual values of the length, width and height are first divided by 5 (the maximum among the length, width and height), and then multiplied by 0.1 (radius R of the hemispherical fish-eye image), so as to obtain the length of 0.1 m, the width of 0.08 m and the height of 0.06 m, which are scaled down in equal proportion.

Figure 6:
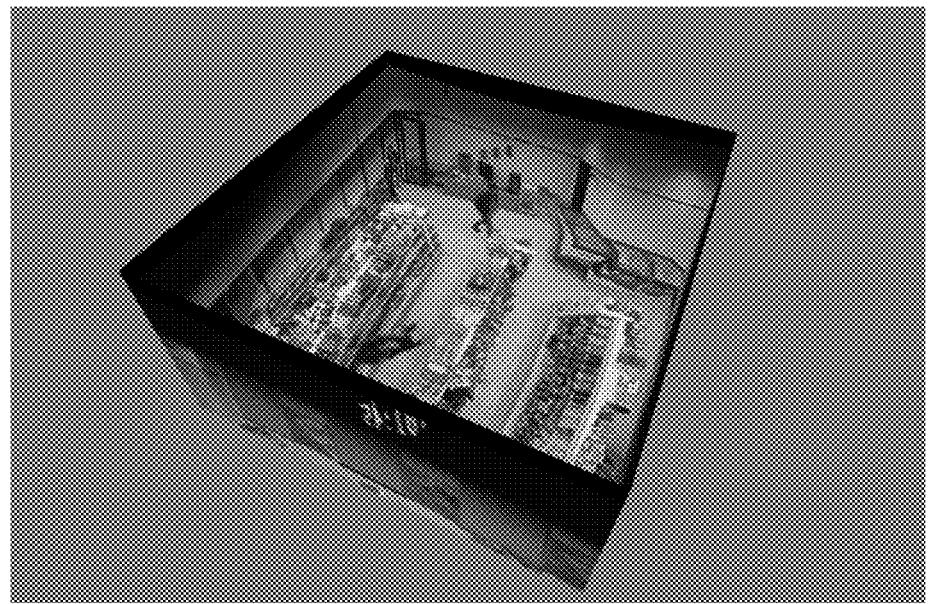
FIG. 6 illustrates the panoramic video image corresponding to the image as shown in FIG. 2.

Based on the above obtained values, the faces in which the four walls and the floor inside the preset living room are located are drawn, and the coordinates for each face may be determined. Based on the frustum parameters of the four texture images in the directions respectively pointing to the four walls and the one texture image in the direction pointing to the floor for the hemispherical fish-eye image, the drawn face corresponding to each texture image is determined. The coordinates for the each texture image are adjusted to positions corresponding to the coordinates for the face corresponding to this texture image. It can be understood by those skilled in the art that one texture image may be rendered onto a face by the existing technology. The detailed description thereof is thus omitted here. The panoramic video image generated from the fish-eye video image is shown in FIG. 6. The generated panoramic video image is consistent with the actual cuboid supermarket.

Each of the frames of the obtained fish-eye video is processed in the method described above. As such, the indoor panoramic video corresponding to the fish-eye video is obtained.

In the embodiment as shown in FIG. 1 of the present application, for each of the frames of the fish-eye video, the coordinates of each of the pixels of the frame in an image coordinate system are converted into coordinates in a spherical coordinate system to obtain a spherical coordinate system-based hemispherical fish-eye image. The frustum parameters of each of the N texture images of N viewing angles for the hemispherical fish-eye image are determined according to the shape of the preset living room. Based on the frustum parameters of each of the N texture images of N viewing angles, the N texture images of N viewing angles for the hemispherical fish-eye image are obtained. The N texture images of N viewing angles are rendered onto the N faces inside the preset living room, to generate the panoramic video image corresponding to the frame. As such, in the embodiments of the present application, each frame of the fish-eye video can be rendered onto N faces inside the preset living room, and thus a panoramic video image having a stereoscopic effect is generated. The real-time performance for generating a panoramic video is improved, as no complicated image stitching algorithm is used in embodiments of the present application. In addition, the cost for camera devices can be reduced, as there is no need to stitch multiple videos shot by several cameras and there is no need for an aerial camera, in embodiments of the present application.

In a practical application, the above method can also be applied to a living room having a corner to generate an indoor panoramic video for the living room having a corner.

Figure 7:
FIG. 7 illustrates the panoramic video image of a living room having a corner generated in another embodiment of the present application.

Assuming that the preset living room has one corner, N is 7. For each of the frames of the fish-eye video, coordinates of each of the pixels of the frame in the image coordinate system are converted into coordinates in a spherical coordinate system to obtain a spherical coordinate system-based hemispherical fish-eye image. The frustum parameters of the 7 texture images of 7 viewing angles for the hemispherical fish-eye image are determined, and then the 7 texture images of 7 viewing angles for the hemispherical fish-eye image are obtained. The 7 texture images of 7 viewing angles are rendered onto the 7 faces inside the preset living room, to generate a panoramic video image for the living room having a corner, as shown in FIG. 7.

Figure 8:
FIG. 8 illustrates a panoramic video image of a storey including multiple cuboid living rooms generated in another embodiment of the present application.

In a practical application, for a storey including multiple cuboid living rooms, an indoor panoramic video image for each cuboid living room can be generated by the above method. As shown in FIG. 8, the multiple indoor panoramic video images generated for the cuboid living rooms may be displayed according to the actual positions of the cuboid living rooms.

In accordance with the above method embodiment, embodiments of the present application further provide an apparatus for generating an indoor panoramic video.

Figure 9:
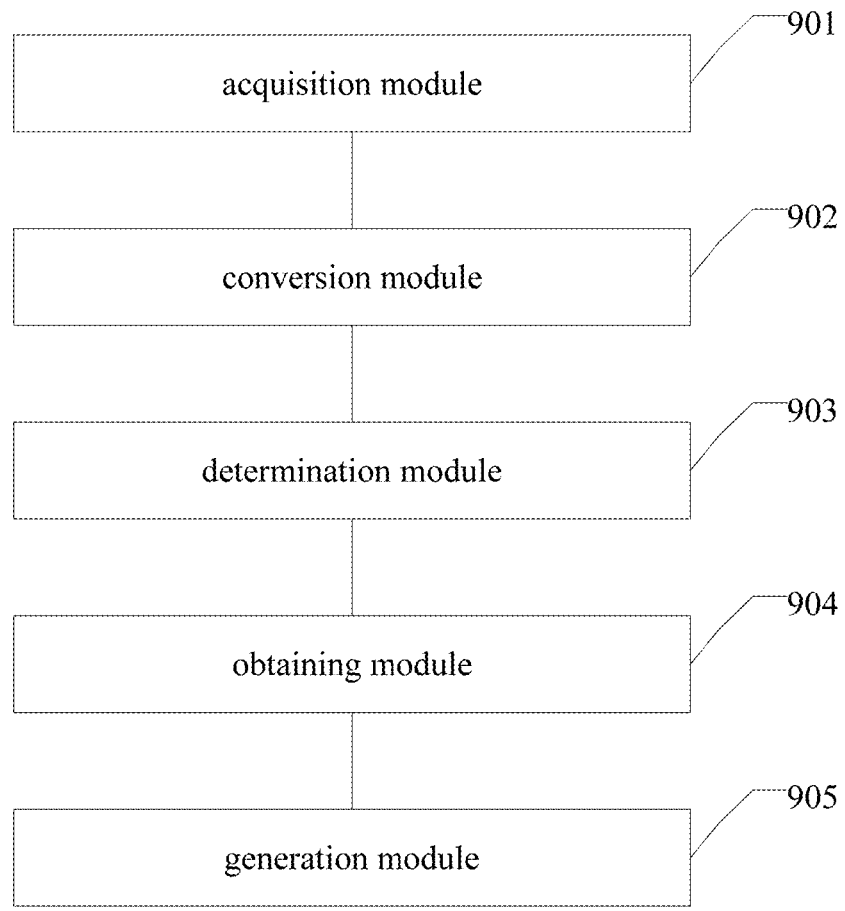
FIG. 9 is a schematic structural diagram of an apparatus for generating an indoor panoramic video provided by an embodiment of the present application.

FIG. 9 is a schematic structural diagram of an apparatus for generating an indoor panoramic video provided by an embodiment of the present application. The apparatus includes an acquisition module 901, a conversion module 902, a determination module 903, an obtaining module 904 and a generating module 905.

The acquisition module 901 is configured for acquiring a fish-eye video.

In a practical application, the acquisition module 901 may be further configured for receiving a fish-eye video sent by one fish-eye camera placed at the center of the ceiling of the living room.

A conversion module 902 is configured for, for each frame of the fish-eye video, converting, according to a first preset rule, coordinates of each of pixels of the frame in an image coordinate system into coordinates in a spherical coordinate system to obtain a spherical coordinate system-based hemispherical fish-eye image.

In a practical application, the conversion module 902 may be further configured for converting, according to following formulas, the coordinates (u, v) of each of the pixels of the frame in the image coordinate system into the coordinates (x, y, z) in the spherical coordinate system to obtain the spherical coordinate system-based hemispherical fish-eye image:

$$u-0.5=x=R*\cos(\alpha)*\cos(\theta)$$

$$v-0.5=y=R*\cos(\alpha)*\sin(\theta)$$

$$z=R*\sin(\alpha)$$

wherein, R is a radius of a hemisphere for the hemispherical fish-eye image, $\alpha$ is an angle between a point in the hemispherical fish-eye image and the Y-axis, and $\theta$ is an angle between a point in the hemispherical fish-eye image and the X-axis.

A determination module 903 is configured for determining, according to a shape of a preset living room, frustum parameters of each of N texture images of N viewing angles for the hemispherical fish-eye image, wherein the shape of the preset living room is set based on a scene corresponding to the frame.

In a practical application, the determination module 903 may include: a construction sub-module and a determination sub-module (not shown in the figure); wherein, the construction sub-module is configured for, when the preset living room is a cuboid living room, constructing an inscribed cuboid of a sphere corresponding to the hemispherical fish-eye image, wherein a length-to-width-to-height radio of the inscribed cuboid is the same as a length-to-width-to-height radio of the cuboid living room; and the determination sub-module is configured for determining, according to the inscribed cuboid, the frustum parameters of each of the N texture images of N viewing angles for the hemispherical fish-eye image. In the present embodiment, N is positive integer.

Specifically, the frustum parameters include angle parameters and viewport parameters of the frustum; the determination sub-module may include: an angle parameter determination sub-module and a viewport parameter determination sub-module (not shown in the figure); wherein, The angle parameter determination sub-module is configured for determining the angle parameters of the frustum of each of the N texture images of N viewing angles according to angles between faces of the inscribed cuboid, wherein the angle parameters include azimuth parameters and elevation parameters; and The viewport parameter determination sub-module is configured for determining the viewport parameters of the frustum of each of the N texture images of N viewing angles according to lengths of edges of the inscribed cuboid, wherein the viewport parameters include left, right, down, up, front and back boundary parameters.

A obtaining module 904 is configured for obtaining, based on the frustum parameters of each of the N texture images of N viewing angles, the N texture images of N viewing angles for the hemispherical fish-eye image.

In a practical application, the obtaining module 904 may be further configured for:

when the preset living room is a cuboid living room, obtaining, based on the frustum parameters of each of the N texture images of N viewing angles, four texture images in the directions respectively pointing to four walls and one texture image in a direction pointing to a floor for the hemispherical fish-eye image.

A generation module 905 is configured for rendering the N texture images of N viewing angles onto N faces inside the preset living room, to generate a panoramic video image corresponding to the frame.

In a practical application, the generation module 905 may include a living room drawing sub-module and a panoramic video image generation sub-module (not shown in the figure); wherein, The living room drawing sub-module is configured for drawing faces in which the four walls and the floor inside the preset living room are located, and determining coordinates for each of the faces; and The panoramic video image generation sub-module is configured for adjusting, according to the frustum parameters of the four texture images in the directions respectively pointing to the four walls and the one texture image in the direction pointing to the floor for the hemispherical fish-eye image, the coordinates for the four texture images in the directions respectively pointing to the four walls and the one texture image in the direction pointing to the floor for the hemispherical fish-eye image to positions corresponding to the coordinates for the faces in which the four walls and the floor are located, so as to generate the panoramic video image corresponding to the frame.

In the embodiment shown in FIG. 9 of the present application, for each of the frames of the fish-eye video, the coordinates of each of the pixels of the frame in an image coordinate system are converted into coordinates in a spherical coordinate system to obtain a spherical coordinate system-based hemispherical fish-eye image. The frustum parameters of each of the N texture images of N viewing angles for the hemispherical fish-eye image are determined according to the shape of a preset living room. Based on the frustum parameters of each of the N texture images of N viewing angles, the N texture images of N viewing angles for the hemispherical fish-eye image are obtained. The N texture images of N viewing angles are rendered onto the N faces inside the preset living room, to generate the panoramic video image corresponding to the frame. As such, in the embodiment of the present application, each frame of the fish-eye video can be rendered onto N faces inside the preset living room, and thus a panoramic video image having a stereoscopic effect is generated. The real-time performance for generating a panoramic video is improved, as no complicated image stitching algorithm is used in embodiments of the present application. In addition, the cost for camera devices can be reduced, as there is no need to stitch multiple videos shot by several cameras and there is no need for an aerial camera in embodiments of the present application.

Figure 10:
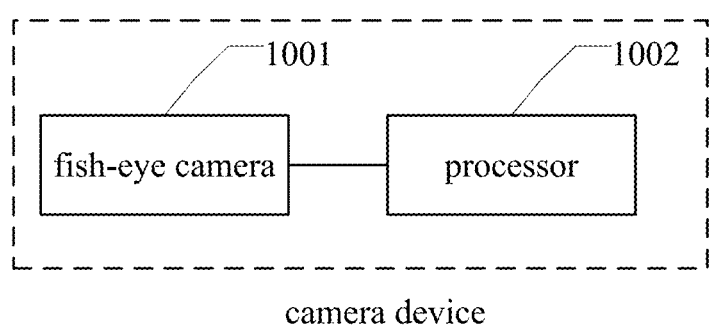
FIG. 10 is a schematic structural diagram of a shooting apparatus provided by an embodiment of the application.

Based on the same design concept as that of the above method, an embodiment of the present application further provides a camera device, as shown in FIG. 10, including a fish-eye camera 1001 and a processor 1002; wherein, the fish-eye camera 1001 is configured for shooting a fish-eye video of a preset living room, and sending the fish-eye video to the processor; the processor is configured for performing the method for generating an indoor panoramic video. The method includes:

acquiring a fish-eye video;

for each frame of the fish-eye video, converting, according to a first preset rule, coordinates of each of pixels of the frame in an image coordinate system into coordinates in a spherical coordinate system to obtain a spherical coordinate system-based hemispherical fish-eye image;

determining, according to a shape of a preset living room, frustum parameters of each of N texture images of N viewing angles for the hemispherical fish-eye image, wherein the shape of the preset living room is set based on a scene corresponding to the frame; and obtaining, based on the frustum parameters of each of the N texture images of N viewing angles, the N texture images of N viewing angles for the hemispherical fish-eye image, and rendering the N texture images of N viewing angles onto N faces inside the preset living room, to generate a panoramic video image corresponding to the frame.

In the embodiment shown in FIG. 10 of the present application, each frame of the fish-eye video can be rendered onto N faces inside the preset living room, and thus a panoramic video image having a stereoscopic effect is generated. The real-time performance for generating a panoramic video is improved, as no complicated image stitching algorithm is used in embodiments of the present application. In addition, the cost for camera devices can be reduced, as there is no need to stitch multiple videos shot by several cameras and there is no need for an aerial camera in embodiments of the present application.

Based on the same design concept as that of the above method, an embodiment of the present application further provides an executable program code which, when executed, performs the method for generating an indoor panoramic video. The method includes:

acquiring a fish-eye video;

for each frame of the fish-eye video, converting, according to a first preset rule, coordinates of each of pixels of the frame in an image coordinate system into coordinates in a spherical coordinate system to obtain a spherical coordinate system-based hemispherical fish-eye image;

determining, according to a shape of a preset living room, frustum parameters of each of N texture images of N viewing angles for the hemispherical fish-eye image, wherein the shape of the preset living room is set based on a scene corresponding to the frame; and obtaining, based on the frustum parameters of each of the N texture images of N viewing angles, the N texture images of N viewing angles for the hemispherical fish-eye image, and rendering the N texture images of N viewing angles onto N faces inside the preset living room, to generate a panoramic video image corresponding to the frame.

In the embodiment shown in the present application, each frame of the fish-eye video can be rendered onto N faces inside the preset living room, and thus a panoramic video image having a stereoscopic effect is generated. The real-time performance for generating a panoramic video is improved, as no complicated image stitching algorithm is used in embodiments of the present application. In addition, the cost for camera devices can be reduced, as there is no need to stitch multiple videos shot by several cameras and there is no need for an aerial camera in embodiments of the present application.

Based on the same design concept as that of the above method, an embodiment of the present application further provides a storage medium. The storage medium is configured for storing an executable program code which, when executed, performs the method for generating an indoor panoramic video. The method includes:

acquiring a fish-eye video; for each frame of the fish-eye video, converting, according to a first preset rule, coordinates of each of pixels of the frame in an image coordinate system into coordinates in a spherical coordinate system to obtain a spherical coordinate system-based hemispherical fish-eye image;

determining, according to a shape of a preset living room, frustum parameters of each of N texture images of N viewing angles for the hemispherical fish-eye image, wherein the shape of the preset living room is set based on a scene corresponding to the frame; and obtaining, based on the frustum parameters of each of the N texture images of N viewing angles, the N texture images of N viewing angles for the hemispherical fish-eye image, and rendering the N texture images of N viewing angles onto N faces inside the preset living room, to generate a panoramic video image corresponding to the frame.

The above storage medium may be, but not limited to, a DVR (Digital Video Record), an NVR (Network Video Recorder), a memory of a camera, and so forth.

In the embodiment shown in the present application, each frame of the fish-eye video can be rendered onto N faces inside the preset living room, and thus a panoramic video image having a stereoscopic effect is generated. The real-time performance for generating a panoramic video is improved, as no complicated image stitching algorithm is used in embodiments of the present application. In addition, the cost for camera devices can be reduced, as there is no need to stitch multiple videos shot by several cameras and there is no need for an aerial camera in embodiments of the present application.

It should be noted that the relationship terms used here, such as "first", "second", and the like are only used to distinguish one entity or operation from another entity or operation, but do not necessarily require or imply that there is actual relationship or order between these entities or operations. Moreover, the terms "include", "comprise", or any variants thereof are intended to cover a non-exclusive inclusion, such that processes, methods, articles, or devices, including a series of elements, include not only those elements that have been listed, but also other elements that have not specifically been listed or the elements intrinsic to these processes, methods, articles, or devices. Without further limitations, elements limited by the wording "include(s) a/an . . . ", "comprise(s) a/an . . . " do not exclude additional identical elements in the processes, methods, articles, or devices, including the listed elements.

All of the embodiments in the description are described in a correlated manner, and identical or similar parts in various embodiments can refer to one another. In addition, the description for each embodiment focuses on the differences from other embodiments. In particular, the embodiment of the apparatus is described briefly, since it is substantially similar to the embodiment of the method, and the related contents can refer to the description of the embodiment of the method.

It can be understood by those skilled in the art that all or a part of steps in the implementations of the above method can be accomplished by instructing related hardware through programs, which can be stored in a computer-readable storage medium, such as in ROM/RAM, a disk, an optical disk, and so on.

The embodiments described above are simply preferable embodiments of the present application, and are not intended to limit the scope of protection of the present application. Any modifications, alternatives, improvements, or the like within the spirit and principle of the present application shall be included within the scope of protection of the present application.

The invention claimed is:

1. A method for generating an indoor panoramic video, which is applicable to a video processing device, comprising:

acquiring a fish-eye video;

for each frame of the fish-eye video, converting, according to a first preset rule, coordinates of each of pixels of the frame in an image coordinate system into coordinates in a spherical coordinate system to obtain a spherical coordinate system-based hemispherical fish-eye image;

determining, according to a shape of a preset living room, frustum parameters of each of N texture images of N viewing angles for the hemispherical fish-eye image, wherein the shape of the preset living room is set based on a scene corresponding to the frame, wherein the frustum parameters include azimuth parameters, elevation parameters, left, right, down, up, front, and back boundary parameters; and obtaining, based on the frustum parameters of each of the N texture images of N viewing angles, the N texture images of N viewing angles for the hemispherical fish-eye image, and rendering the N texture images of N viewing angles onto N faces inside the preset living room, to generate a panoramic video image corresponding to the frame.

2. The method of claim 1, wherein, converting, according to a first preset rule, coordinates of each of pixels of the frame in an image coordinate system into coordinates in a spherical coordinate system to obtain a spherical coordinate system-based hemispherical fish-eye image comprises:

converting, according to following formulas, the coordinates (u, v) of each of the pixels of the frame in the image coordinate system into the coordinates (x, y, z) in the spherical coordinate system to obtain the spherical coordinate system-based hemispherical fish-eye image:

$$u-0.5=x=R*\cos(\alpha)*\cos(\theta)$$

$$v-0.5=y=R*\cos(\alpha)*\sin(\theta)$$

$$z=R*\sin(\alpha)$$

wherein, R is a radius of a hemisphere for the hemispherical fish-eye image, $\alpha$ is an angle between a point in the hemispherical fish-eye image and the Y-axis, and $\theta$ is an angle between a point in the hemispherical fish-eye image and the X-axis.

3. The method of claim 1, wherein, when the preset living room is a cuboid living room, determining, according to a shape of a preset living room, frustum parameters of each of N texture images of N viewing angles for the hemispherical fish-eye image comprises:

constructing an inscribed cuboid of a sphere corresponding to the hemispherical fish-eye image, wherein a length-to-width-to-height radio of the inscribed cuboid is the same as a length-to-width-to-height radio of the cuboid living room; and determining, according to the inscribed cuboid, the frustum parameters of each of the N texture images of N viewing angles for the hemispherical fish-eye image.

4. The method of claim 3, wherein, the frustum parameters comprise angle parameters and viewport parameters of a frustum;

determining, according to the inscribed cuboid, the frustum parameters of each of the N texture images of N viewing angles for the hemispherical fish-eye image comprises:

determining the angle parameters of the frustum of each of the N texture images of N viewing angles according to angles between faces of the inscribed cuboid, wherein the angle parameters comprise azimuth parameters and elevation parameters; and determining the viewport parameters of the frustum of each of the N texture images of N viewing angles according to lengths of edges of the inscribed cuboid, wherein the viewport parameters comprise left, right, down, up, front and back boundary parameters.

5. The method of claim 1, wherein, when the preset living room is a cuboid living room, obtaining the N texture images of N viewing angles for the hemispherical fish-eye image comprises:

obtaining four texture images in directions respectively pointing to four walls and one texture image in a direction pointing to a floor for the hemispherical fish-eye image.

6. The method of claim 5, wherein, rendering the N texture images of N viewing angles onto N faces inside the preset living room, comprises:

drawing faces in which the four walls and the floor inside the preset living room are located, and determining coordinates for each of the faces;

adjusting, according to the frustum parameters of the four texture images in the directions respectively pointing to the four walls and the one texture image in the direction pointing to the floor for the hemispherical fish-eye image, the coordinates for the four texture images in the directions respectively pointing to the four walls and the one texture image in the direction pointing to the floor for the hemispherical fish-eye image to positions corresponding to the coordinates for the faces in which the four walls and the floor are located.

7. The method of claim 1, wherein, acquiring a fish-eye video, comprises:

receiving a fish-eye video sent by one fish-eye camera placed at the center of the ceiling of the living room.

8. A camera device comprising a fish-eye camera and a processor, wherein, the fish-eye camera is configured for shooting a fish-eye video of a preset living room, and sending the fish-eye video to the processor; and the processor is configured for performing operations of:

acquiring a fish-eye video;

for each frame of the fish-eye video, converting, according to a first preset rule, coordinates of each of pixels of the frame in an image coordinate system into coordinates in a spherical coordinate system to obtain a spherical coordinate system-based hemispherical fish-eye image;

determining, according to a shape of a preset living room, frustum parameters of each of N texture images of N viewing angles for the hemispherical fish-eye image, wherein the shape of the preset living room is set based on a scene corresponding to the frame, wherein the frustum parameters include azimuth parameters, elevation parameters, left, right, down, up, front and back boundary parameters; and obtaining, based on the frustum parameters of each of the N texture images of N viewing angles, the N texture images of N viewing angles for the hemispherical fish-eye image, and rendering the N texture images of N viewing angles onto N faces inside the preset living room, to generate a panoramic video image corresponding to the frame.

9. A non-transitory storage medium for storing an executable program code, wherein the executable program code, when executed, performs the method for generating an indoor panoramic video of claim 1.

10. The camera device of claim 8, wherein the processor is configured for converting, according to following formulas, the coordinates (u, v) of each of the pixels of the frame in the image coordinate system into the coordinates (x, y, z) in the spherical coordinate system to obtain the spherical coordinate system-based hemispherical fish-eye image:

$$u-0.5=x=R*\cos(\alpha)*\cos(\theta)$$

$$v-0.5=y=R*\cos(\alpha)*\sin(\theta)$$

$$z=R*\sin(\alpha)$$

wherein, R is a radius of a hemisphere for the hemispherical fish-eye image, $\alpha$ is an angle between a point in the hemispherical fish-eye image and the Y-axis, and $\theta$ is an angle between a point in the hemispherical fish-eye image and the X-axis.

11. The camera device of claim 8, wherein the processor is configured for, when the preset living room is a cuboid living room, constructing an inscribed cuboid of a sphere corresponding to the hemispherical fish-eye image, wherein a length-to-width-to-height radio of the inscribed cuboid is the same as a length-to-width-to-height radio of the cuboid living room; and determining, according to the inscribed cuboid, the frustum parameters of each of the N texture images of N viewing angles for the hemispherical fish-eye image.

12. The camera device of claim 11, wherein the frustum parameters comprise angle parameters and viewport parameters of a frustum; the processor is configured for:

determining the angle parameters of the frustum of each of the N texture images of N viewing angles according to angles between faces of the inscribed cuboid, wherein the angle parameters comprise azimuth parameters and elevation parameters; and determining the viewport parameters of the frustum of each of the N texture images of N viewing angles according to lengths of edges of the inscribed cuboid, wherein the viewport parameters comprise left, right, down, up, front and back boundary parameters.

13. The camera device of claim 8, wherein the processor is configured for, when the preset living room is a cuboid living room, obtaining four texture images in directions respectively pointing to four walls and one texture image in a direction pointing to a floor for the hemispherical fish-eye image.

14. The camera device of claim 13, wherein the processor is configured for:

drawing faces in which the four walls and the floor inside the preset living room are located, and determining coordinates for each of the faces; and adjusting, according to the frustum parameters of the four texture images in the directions respectively pointing to the four walls and the one texture image in the direction pointing to the floor for the hemispherical fish-eye image, the coordinates for the four texture images in the directions respectively pointing to the four walls and the one texture image in the direction pointing to the floor for the hemispherical fish-eye image to positions corresponding to the coordinates for the faces in which the four walls and the floor are located.

15. The camera device of claim 8, wherein the processor is configured for receiving a fish-eye video sent by one fish-eye camera placed at the center of the ceiling of the living room.

* * * * *